US007661724B2

(12) United States Patent
Arosio

(10) Patent No.: US 7,661,724 B2
(45) Date of Patent: Feb. 16, 2010

(54) QUICK COUPLING

(75) Inventor: Massimo Arosio, Treviglio (IT)

(73) Assignee: Faster S.p.A., Rivolta, d'Adda (IT)

( * ) Notice: Subject to any disclaimer, the term of this patent is extended or adjusted under 35 U.S.C. 154(b) by 63 days.

(21) Appl. No.: 11/799,554

(22) Filed: May 2, 2007

(65) Prior Publication Data

US 2007/0257485 A1 Nov. 8, 2007

(30) Foreign Application Priority Data

May 3, 2006 (IT) .......................... MI2006A0863

(51) Int. Cl.
*F16L 27/00* (2006.01)
(52) U.S. Cl. ........................... 285/277; 285/86; 285/92; 285/316
(58) Field of Classification Search ................ 285/316, 285/277, 276, 86, 92
See application file for complete search history.

(56) References Cited

U.S. PATENT DOCUMENTS

| 1,580,694 | A | * | 4/1926 | Smith ......................... 251/89.5 |
| 2,665,928 | A | * | 1/1954 | Omon et al. ................. 285/313 |
| 2,934,359 | A | * | 4/1960 | Smisko et al. ................. 285/86 |
| 3,112,767 | A | * | 12/1963 | Cator ..................... 137/614.06 |
| 3,229,996 | A | * | 1/1966 | Cadwell ...................... 285/110 |
| 3,446,245 | A | * | 5/1969 | Snyder, Jr. ............. 137/614.03 |
| 3,727,952 | A | * | 4/1973 | Richardson .................. 285/101 |
| 3,889,983 | A | * | 6/1975 | Freize et al. ................... 285/13 |
| 4,005,735 | A | * | 2/1977 | Miyamoto ................ 138/96 R |
| 4,007,909 | A | * | 2/1977 | Buseth et al. ............ 251/149.2 |
| 4,776,614 | A | * | 10/1988 | Marrison et al. ............... 285/87 |
| 5,127,679 | A | * | 7/1992 | Pouplier ....................... 285/92 |
| 5,161,831 | A | * | 11/1992 | Eckhardt ..................... 285/276 |
| 5,165,734 | A | * | 11/1992 | Smith ......................... 285/276 |
| 5,209,262 | A | * | 5/1993 | Carow et al. ........... 137/614.04 |
| 5,303,959 | A | * | 4/1994 | Medsker ....................... 285/24 |
| 5,816,624 | A | * | 10/1998 | Smith ......................... 285/276 |
| 5,851,035 | A | * | 12/1998 | Marc et al. ..................... 285/86 |
| 6,086,112 | A | * | 7/2000 | Schofield et al. .............. 285/98 |
| 6,257,278 | B1 | * | 7/2001 | Danielson et al. ....... 137/614.03 |
| 6,550,817 | B1 | * | 4/2003 | Mitchell .................. 285/147.1 |
| 6,904,932 | B1 | * | 6/2005 | Haraughty .................. 137/231 |
| 7,213,845 | B2 | * | 5/2007 | Sato et al. ...................... 285/86 |

* cited by examiner

*Primary Examiner*—David E Bochna
(74) *Attorney, Agent, or Firm*—Kirschstein, et al.

(57) ABSTRACT

A quick coupling comprises a male element (2) which can be threadably assembled to a female element (3), housing an inner tubular supporting body (8) in turn housing a bearing (11) thereon the female element (3) bears, the female element (3) including a plurality of radially extending holes (20) in which are engaged ball elements (21) which can be fitted in a circumferential slot formed in the male body (2) and being adapted to be radially locked by an enlarged portion (16) formed on an inner side of a ring nut which can be driven against an urging spring (17) pertaining to the female element.

7 Claims, 3 Drawing Sheets

QUICK COUPLING

BACKGROUND OF THE INVENTION

The present invention relates to a quick coupling providing a safe connection of mechanical parts, an easy plug-in, respectively plug-out, of the quick coupling components, an efficient mutual connection and plug-in/plug-out, without using operating tools.

A well known requirement of the prior art, in particular in the electric or electronic apparatus refrigerating field, is that of continuously refrigerating electric or electronic components included in said apparatus.

This is usually performed by using a plurality of pipes designed for supplying a refrigerating fluid to the devices to be refrigerated, and return ducts for recovering the refrigerating fluid.

Said delivery or feeding, respectively return, pipes or ducts, are conventionally coupled to the devices to be refrigerated, by means of quick-coupling assemblies.

In a prior quick coupling assembly, the male element thereof has a male element thread which can be engaged with a female element thread formed on the female part of the coupling.

To prevent the two bodies of the quick coupling from accidentally detaching and sliding away, said prior quick couplings usually comprise a protective ring nut element which can be clamped under a clamping torque applied by a torque wrench.

A drawback of such a prior arrangement is that both the connecting and disengaging operations of the threaded parts require that a tool be used, such as a torque wrench.

Such a tool must also be used for overcoming the great friction occurring, in particular, between an inner tubular element and an outer tubular element of the quick coupling female part.

SUMMARY OF THE INVENTION

Thus, the object of the present invention is to provide a novel quick coupling allowing the threaded bodies thereof to be slidably connected, respectively disconnected, by simple manual operations, without requiring operating tools, while providing a safe connection of the quick coupling bodies.

According to the present invention, the above mentioned object is achieved by a quick coupling comprising a male element which can be threadably connected to a female body, said female body including an inner tubular body housing a bearing on which an outer tubular body bears.

Advantageously, the female body outer tubular body comprises, at a front side thereof, a plurality of circumferentially extending holes housing radially movable ball elements therein, said ball elements being adapted to be engaged in a circumferential slot of the male body, said ball elements being adapted to be radially locked by a circumferential enlarged portion formed on the inner side of a female body ring nut and adapted to be driven against a counter-biasing spring.

BRIEF DESCRIPTION OF THE DRAWINGS

The subject matter of the present invention will be disclosed and illustrated in a more detailed manner hereinafter with reference to an exemplary embodiment thereof, which is shown in the accompanying drawings, where.

DESCRIPTION OF THE PREFERRED EMBODIMENT

Figure 1:
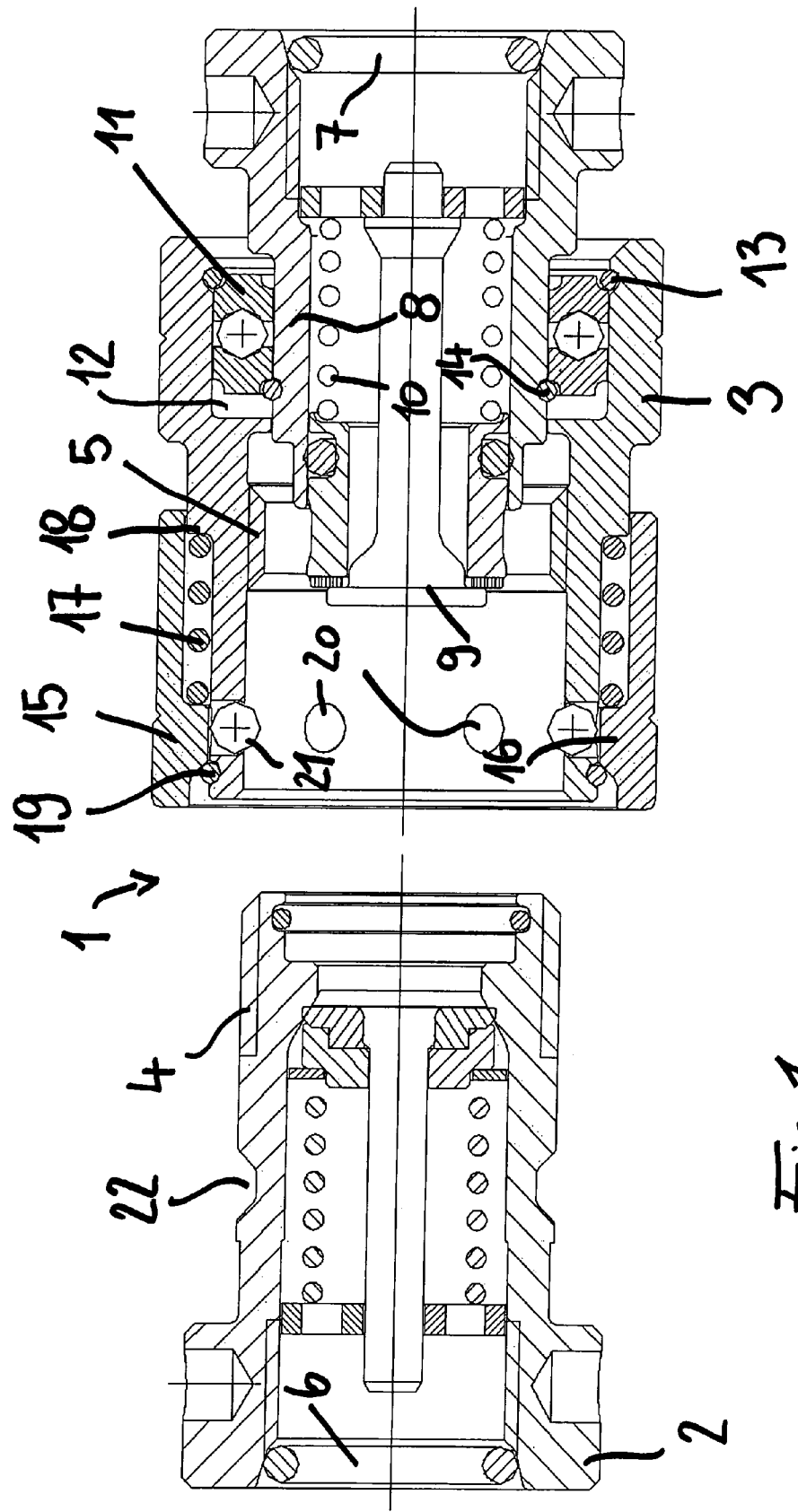
FIG. 1 is a longitudinal cross-sectional view showing the male element and female element of a quick coupling in a disassembled condition thereof.

As shown in FIG. 1, the quick coupling, generally indicated by the reference number 1, comprises a quick coupling male element 2 and a quick coupling female element 3 which can be mutually coupled to one another.

To provide a threaded type of connection, the male element 2 comprises, at a front portion thereof, an outer thread 4, to be coupled with an inner thread 5 formed inside the female body or element 3.

The operating fluid, such as a refrigerating fluid, is supplied, in a per se known manner, either through the inlet 6 of the male body 2 or through the inlet 7 of the female element 3.

The inlet 7 is formed in a tubular body 8 housing a longitudinally extending stem 9 encompassed by a spring 10, as known in the prior art.

The constructional elements 9 and 10, and related gaskets, advantageously O-ring seals, will be not disclosed in further details therein, since they are well known in the prior art and are conventionally used in prior quick couplings.

Advantageously, the tubular body 8 houses therein a bearing 11, advantageously a thrust bearing, designed for resisting both against axial pushing forces and against radial efforts. More specifically, the bearing 11 is housed in an annular chamber 12 formed in the outer tubular body 3 forming the female part of the quick coupling.

Also advantageously, the bearing 11 is held in its desired position by resilient ring elements 13 and 14, engaged in suitable engaging slots; in this connection it should be apparent that it would be also possible to provide other locating and locking means for properly locating and locking the bearing.

Thus, owing to the provision of the bearing 11, any friction forces between the outer body 3 and inner tubular body 8 of the female element will be practically eliminated, thereby allowing the connection, respectively disconnection, of the threaded parts 4 and 5 to be manually carried out, in a very easy manner and without using operating tools, since any friction forces, as operating in prior couplings, are herein overcome, owing to the provision of said bearing 11.

The front side or portion of the female body 3 of the quick coupling 1 receives herein a movable ring-nut element 15 having, on a front side thereof, an inner annular enlarged portion 16 there against abuts a spring 17 which also abuts against an outer shoulder 18, positionally fixed, of the tubular body 3.

At the front portion thereof, said ring nut 15 is held at an end position by a resilient ring element 19.

A plurality of radially extending holes 20 are circumferentially formed in the front portion of the tubular body 3, said holes receiving therein a corresponding plurality of ball elements 21 which, in a fully assembled condition of the male body 2 and female body 3, are engaged in a circumferential groove 22 of the male body 2, and operate as locking means as they are engaged in the circumferential groove 22 upon connecting the bodies 2 and 3.

Figure 2:
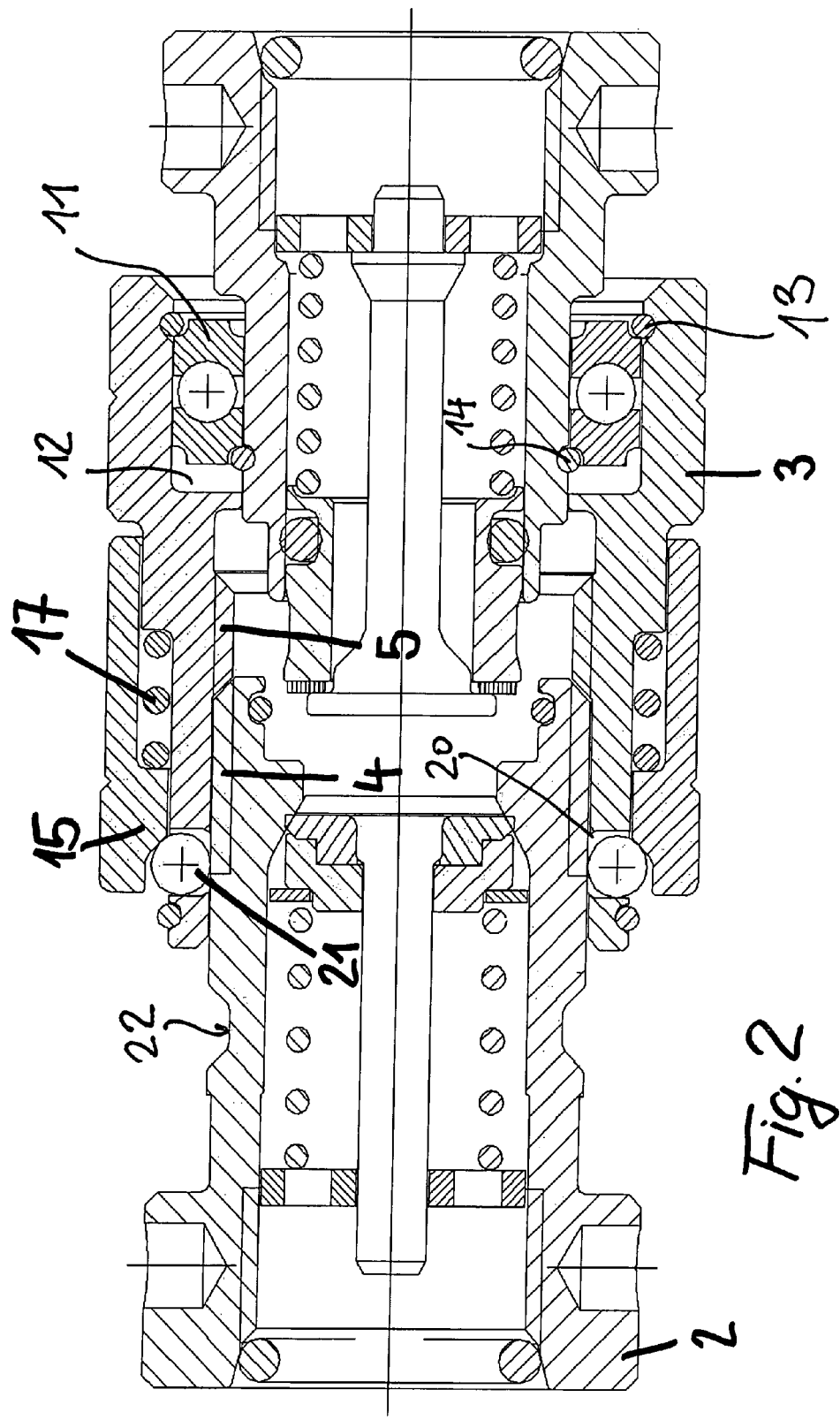
FIG. 2 is a further longitudinal cross-sectional view showing the components of the quick coupling in a partially threaded assembled condition.

Upon threading the body 2, by the threads 4 and 5, in the female body 3, said ball elements 21 will be radially outward displaced from the male body 2 and, accordingly, will cause the ring nut 15 to be backward driven (FIG. 2), thereby pressing the spring 17.

Figure 3:
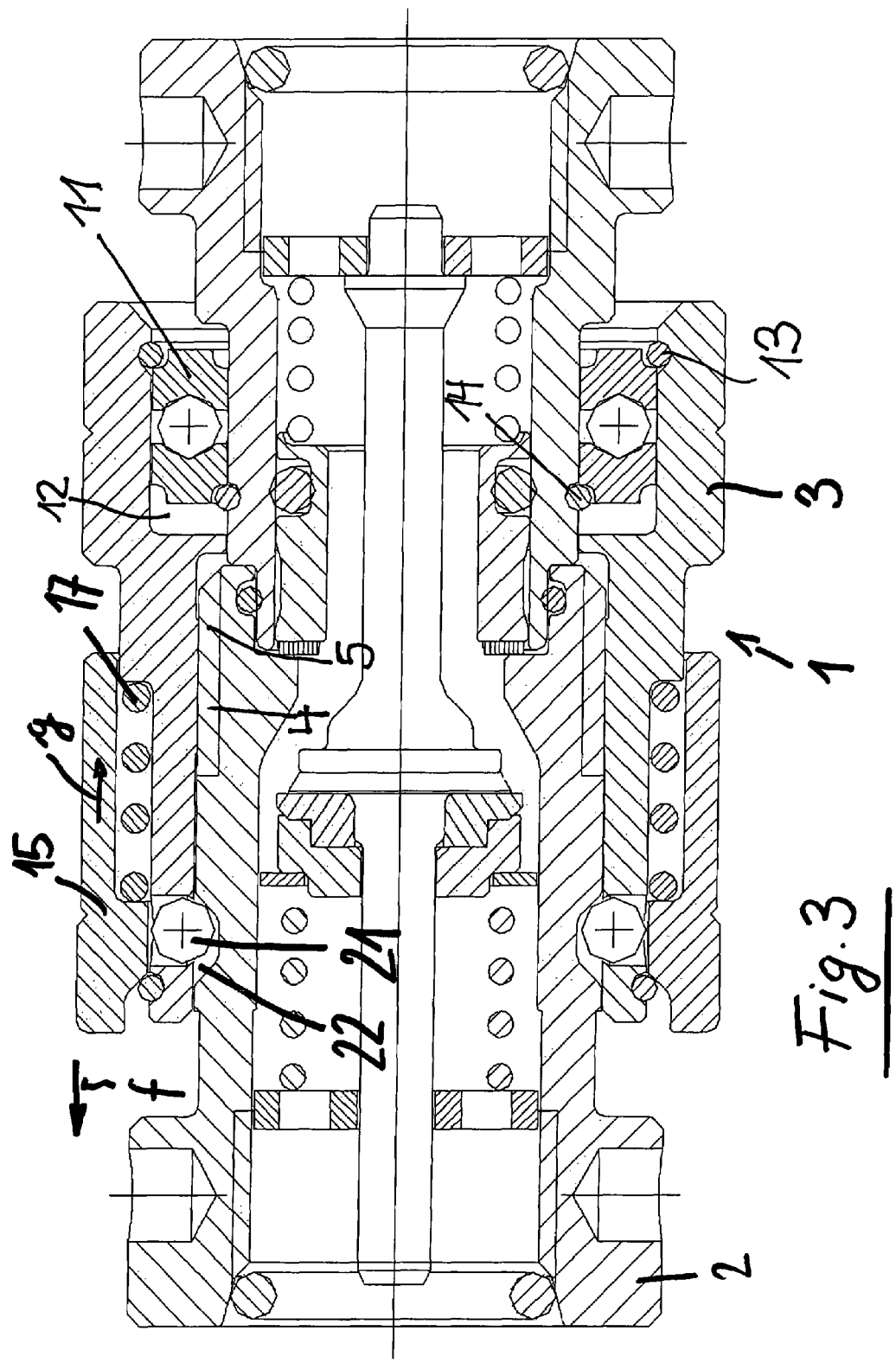
FIG. 3 shows the components of the quick coupling in a fully assembled condition.

With the body 2 fully threaded in the tubular body 3 of the quick coupling, generally indicated by the reference number 1, the ball elements 21 will enter the groove or slot 22 of the male body 2 thereby causing the spring 17 to drive the ring nut 15 in the direction shown by the arrow (f) in FIG. 3, thereby the inner radially extending enlarged portion 16 will be arranged above the ball elements 21 to in turn lock the latter at their desired positions thereby providing a safe and properly locked connection between the body 2 and body 3 of the quick coupling 1.

As is desired to disconnect the body 2 from the body 3, the ring nut 15 must be displaced in the direction indicated by the arrow (g) in FIG. 3, to allow the ball elements 21, which are now in a free condition, to be radially displaced, to withdraw the body 2 from the tubular body 3, since the ball elements 21 will be able of freely radially outward moving, to allow the body 2 to be easily disengaged.

The invention claimed is:

1. A quick coupling, comprising:
a male element having a circumferential slot extending around an axis, a female element for threaded connection to the male element, the female element having an inner tubular body and an outer tubular body bounding an annular chamber with the inner tubular body, a bearing provided in the annular chamber for reducing friction between the inner tubular body and the outer tubular body, the outer tubular body having, at a front portion thereof, a plurality of circumferentially arrnged holes for receiving a corresponding plurality of radially movable balls, the balls being received in the circumferential slot when the female element is threadedly connected to the male element, and a ring nut mounted for axial movement on the outer tubular body, the ring nut having a circumferential enlarged portion and a spring biased against the outer tubular body, the circumferential enlarged portion radially locking the balls in the circumferential slot when the female element is threadedly connected to the male element.

2. The quick coupling of claim 1, wherein the bearing is a thrust bearing.

3. The quick coupling of claim 1, wherein the bearing is restrained in the annular chamber by resilient ring elements mounted in engaging slots.

4. The quick coupling of claim 1, wherein the spring abuts against an outer shoulder of the outer tubular body.

5. quick coupling of claim 1, wherein the ring nut is restrained by a resilient ring element when the female element is threadedly connected to the male element.

6. The quick coupling of claim 1, wherein the female and male elements have threaded portions.

7. The quick coupling of claim 1, wherein the female and male elements have ports through which a refrigerating liquid flows.

\* \* \* \* \*